(12) United States Patent
Greenshpon et al.

(10) Patent No.: US 8,402,546 B2
(45) Date of Patent: Mar. 19, 2013

(54) ESTIMATING AND VISUALIZING SECURITY RISK IN INFORMATION TECHNOLOGY SYSTEMS

(75) Inventors: Adar Greenshpon, Haifa (IL); Ron Karidi, Herzeliya (IL); Yair Helman, Kefar Neter (IL); Shai Aharon Rubin, Binyamina (IL)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 12/274,309

(22) Filed: Nov. 19, 2008

(65) Prior Publication Data
US 2010/0125912 A1 May 20, 2010

(51) Int. Cl.
*H04L 29/06* (2006.01)
(52) U.S. Cl. ............. 726/25; 726/12; 726/22; 726/23; 726/24; 706/52; 715/771; 715/764
(58) Field of Classification Search .......... 726/1, 22–25; 706/52; 715/771, 764
See application file for complete search history.

(56) References Cited

U.S. PATENT DOCUMENTS

| | | | |
|---|---|---|---|
| 7,219,239 B1 | 5/2007 | Njemanze et al. | |
| 7,747,494 B1 * | 6/2010 | Kothari et al. | 705/35 |
| 7,890,869 B1 * | 2/2011 | Mayer et al. | 715/736 |
| 2002/0147803 A1 | 10/2002 | Dodd et al. | |
| 2006/0117388 A1 | 6/2006 | Nelson et al. | |
| 2006/0156407 A1 | 7/2006 | Cummins | |
| 2007/0006315 A1 | 1/2007 | Bushnaq | |
| 2007/0067846 A1 | 3/2007 | McFarlane et al. | |
| 2007/0169194 A1 | 7/2007 | Church et al. | |
| 2007/0273497 A1 | 11/2007 | Kuroda et al. | |

OTHER PUBLICATIONS

In et al., "A Security Risk Analysis Model for Information Systems", AsiaSim 2004, LNAP 3398, pp. 505-513, Springer-Verlag Berlin Heidelberg, 2005.*
Salvati, et al., "Towards a Scenario Bassed Risk Model for Information Systems", retrieved at <<http://www.Isa.ethz.ch/people/phd/salvatid/DS-Scenario-Based-Risk-Model.pdf>>, pp. 21.
Hansen, Kine Kvernstad, "Towards a UML Profile for Model-Based Risk Assessment of Security Critical Systems", retrieved at <<http://www.idi.ntnu.no/grupper/su/su-diploma-2003/kine-kvernstad2003.pdf>>, Jun. 27, 2003, pp. 101.
Gregg, Michael C., "CISSP Security-Management Practices", retrieved at <<http://www.informit.com/articles/printerfriendly.aspx?p=418007>>, Oct. 28, 2005, pp. 19.

* cited by examiner

*Primary Examiner* — Brandon Hoffman
*Assistant Examiner* — Hee Song
(74) *Attorney, Agent, or Firm* — Mayer & Williams PC (57) ABSTRACT

Security risk for a single IT asset and/or a set of IT assets in a network such as an enterprise or corporate network may be estimated and represented in a visual form by categorizing risk into different discrete levels. The IT assets may include both computing devices and users. The risk categorization uses a security assessment of an IT asset that is generated to indicate the type of security problem encountered, the severity of the problem, and the fidelity of the assessment. The asset value of an IT asset to the enterprise is also assigned. Security risk is then categorized (and a numeric risk value provided) for each IT asset for different problem types by considering the IT asset value along with the severity and fidelity of the security assessment. The security risk for the enterprise is estimated using the numeric risk value and then displayed in visual form.

18 Claims, 7 Drawing Sheets

| Input | | | Output | |
|---|---|---|---|---|
| Asset Value | Assessment Fidelity | Assessment Severity | Risk category | Numeric risk value (will be used for calculating risk for a set of IT assets) |
| Critical | High | High | High | 5 |
| Critical | High | Med | High | 5 |
| Critical | High | Low | High | 5 |
| Critical | Med | High | High | 5 |
| Important | High | High | High | 4 |
| Critical | Med | Med | High | 4 |
| Important | High | Med | High | 4 |
| Important | Med | High | High | 4 |
| Critical | Low | High | Medium | 3 |
| Normal | High | High | Medium | 3 |
| Important | High | Low | Medium | 3 |
| Important | Med | Med | Medium | 3 |
| Critical | Med | Low | Medium | 3 |
| Normal | High | Med | Medium | 2 |
| Critical | Low | Med | Low | 1 |
| Important | Low | High | Medium | 2 |
| Normal | Med | High | Medium | 2 |
| Important | Med | Low | Medium | 2 |
| Critical | Low | Low | Low | 1 |
| Important | Low | Med | No | 0 |
| Normal | Med | Med | Low | 1 |
| Normal | High | Low | Low | 1 |
| Important | Low | Low | Low | 1 |
| Normal | Low | High | No | 0 |
| Normal | Med | Low | No | 0 |
| Normal | Low | Med | No | 0 |

Table 1

FIG. 6

| Input | | | Output | |
|---|---|---|---|---|
| Asset Value | Assessment Fidelity | Assessment Severity | Risk Category | Numeric risk value (will be used for calculating risk for a set of IT assets) |
| Critical | High | High | Medium | 3 |
| Critical | High | Med | Medium | 3 |
| Critical | High | Low | Medium | 3 |
| Critical | Med | High | Medium | 3 |
| Important | High | High | Medium | 2 |
| Critical | Med | Med | Medium | 2 |
| Important | High | Med | Medium | 2 |
| Important | Med | High | Medium | 2 |
| Critical | Low | High | Low | 1 |
| Normal | High | High | Low | 1 |
| Important | High | Low | Low | 1 |
| Important | Med | Med | Low | 1 |
| Critical | Med | Low | Low | 1 |
| Normal | High | Med | Low | 1 |
| Critical | Low | Med | Low | 1 |
| Important | Low | High | Low | 1 |
| Normal | Med | High | Low | 1 |
| Important | Med | Low | Low | 1 |
| Critical | Low | Low | Low | 1 |
| Important | Low | Med | No | 0 |
| Normal | Med | Med | No | 0 |
| Normal | High | Low | No | 0 |
| Important | Low | Low | No | 0 |
| Normal | Low | High | No | 0 |
| Normal | Med | Low | No | 0 |
| Normal | Low | Med | No | 0 |

Table 2

*FIG. 7*

| Rule | Numeric risk value | Thresholds for calculating discrete security risk | | |
|---|---|---|---|---|
| | | Low | Medium | High |
| 1 | >= 1 | 20% | 60% | 100% |
| 2 | >= 2 | 10% | 20% | 30% |
| 3 | >= 3 | 5% | 10% | 15% |
| 4 | >= 4 | 1 | 3 | 5 |
| 5 | >= 5 | | | 1 |

Table 3

ESTIMATING AND VISUALIZING SECURITY RISK IN INFORMATION TECHNOLOGY SYSTEMS

BACKGROUND

In an enterprise computing network a number of personal computers, workstations, servers and the like, along with other devices such as mass storage subsystems, internal network interfaces, and external network interfaces, are typically interconnected to provide an integrated environment in which information may be generated, accessed from external sources, and be communicated among various users in some cases. Commonly, users perform a variety of operations including, for example, order receipt, manufacturing, shipping, billing, inventory control, document preparation and management, e-mail, web browsing, and other operations in which creation, access, and communication of data is beneficial.

Malicious software ("malware") and attacks from hackers can present significant challenges to enterprise security administrators who need to provide a secure environment for their IT (information technology) assets, which typically include both machines and users. Malicious attacks, malware, and other potentially unwanted software can have a tremendous impact on security, reliability, and privacy of IT assets. Attackers are becoming increasingly motivated by financial gain, stealing confidential or personal information, rather than simply vandalizing a client machine. In addition, users can experience serious problems with the stability and performance of their computers, due to the presence of spyware or other forms of unwanted software on their computers. Other vulnerabilities may also exist including, for example, improper configuration of the IT assets, missing updates and patches, and similar issues which can pose additional security risks for an enterprise.

Various tools and security products are available to detect and remove malware threats such as network intrusion detection systems ("NIDs"), server protection products, firewalls, host protection products, and other network protection technologies. However, effectively securing an enterprise environment will typically involve more than detection and removal of specific threats. Client machines must be correctly updated, configured, and managed in order to prevent attacks before they happen. It is important for security administrators to have effective and efficient methods to understand which IT assets are vulnerable or compromised in order to configure them according to security best practices.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Security risk for a single IT asset and/or a set of IT assets in a network such as an enterprise or corporate network may be estimated and represented in a visual form by an arrangement that categorizes risk into different discrete levels. The IT assets may include both computing devices and users. The risk categorization uses a security assessment on an IT asset that is generated to indicate the type of security problem encountered (whether compromised or vulnerable), the severity of the problem (i.e., the scope of damage caused by, or which might be caused by, the security problem with the IT asset), and the fidelity of the assessment (i.e., the level of confidence that the security problem actually exists). The asset value of an IT asset to the enterprise is also assigned. The asset value of an IT asset represents the potential damage to the enterprise when this asset is lost or fatally damaged. Security risk is then categorized (and a numeric risk value provided) for each IT asset for different problem types by considering the IT asset value along with the severity and fidelity of the security assessment. The security risk for the entire enterprise is estimated using the numeric risk value and then displayed in visual form for the security administrator.

In various illustrative examples, one or more security products deployed in the enterprise network and/or as client-side security products are configured to monitor IT assets and generate the security assessments. The assessment uses a taxonomy that categorizes the security problem into different types—for example, compromised (i.e., an IT asset is actually affected from malware or malicious activity, for example, a client machine is infected with a virus, or a user account is compromised when the user's password gets stolen) and vulnerable (i.e., an IT asset is potentially at risk for becoming compromised, for example, because a client machine is missing an important patch or update or a user account is only protected with a weak password). The taxonomy further provides three levels—low, medium, or high—for both the severity of the problem and for the fidelity of a security assessment. IT assets are further categorized to have one of three values—critical, important, or normal.

Security risk is then estimated for different combinations of asset value, assessment fidelity, and assessment severity for each of the different problem types (e.g., compromised and vulnerable). The estimated risk is expressed using one of three discrete categories—high, medium, or low. In addition to risk category, numeric risk values for the respective combinations of asset value/fidelity/severity are provided.

The enterprise risk is provided in a visual "dashboard" form that displays a combination of indicators on the security administrator's console. These include a display of the discrete categorization of risk (i.e., one of low, medium, or high), a continuous risk display (using, for example, a color-coded dial indicator to show varying levels of risk), and text explanations of a particular problem in the enterprise network. An algorithm is applied to the numeric risk values in order to set the position of the indicator on the dial. As conditions dynamically change in the enterprise network some IT assets may be impacted by security problems while other assets may have their problems remediated. The changing conditions may then be reflected in a change to the discrete categorization of security risk and/or change to the position of the indicator on the continuous risk meter, as appropriate. The text explanations provide additional detail and context to assist the security administrator to understand the reasons behind the security risk that is expressed by the visual indicators.

Advantageously, the present security risk estimation and visualization arrangement simplifies the administration of security in an enterprise network and surfaces only the top issues of the current moment. The security administrator can, at a glance, view a security risk status for the enterprise network as a whole and then quickly identify any problems with a particular IT asset that may need immediate attention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
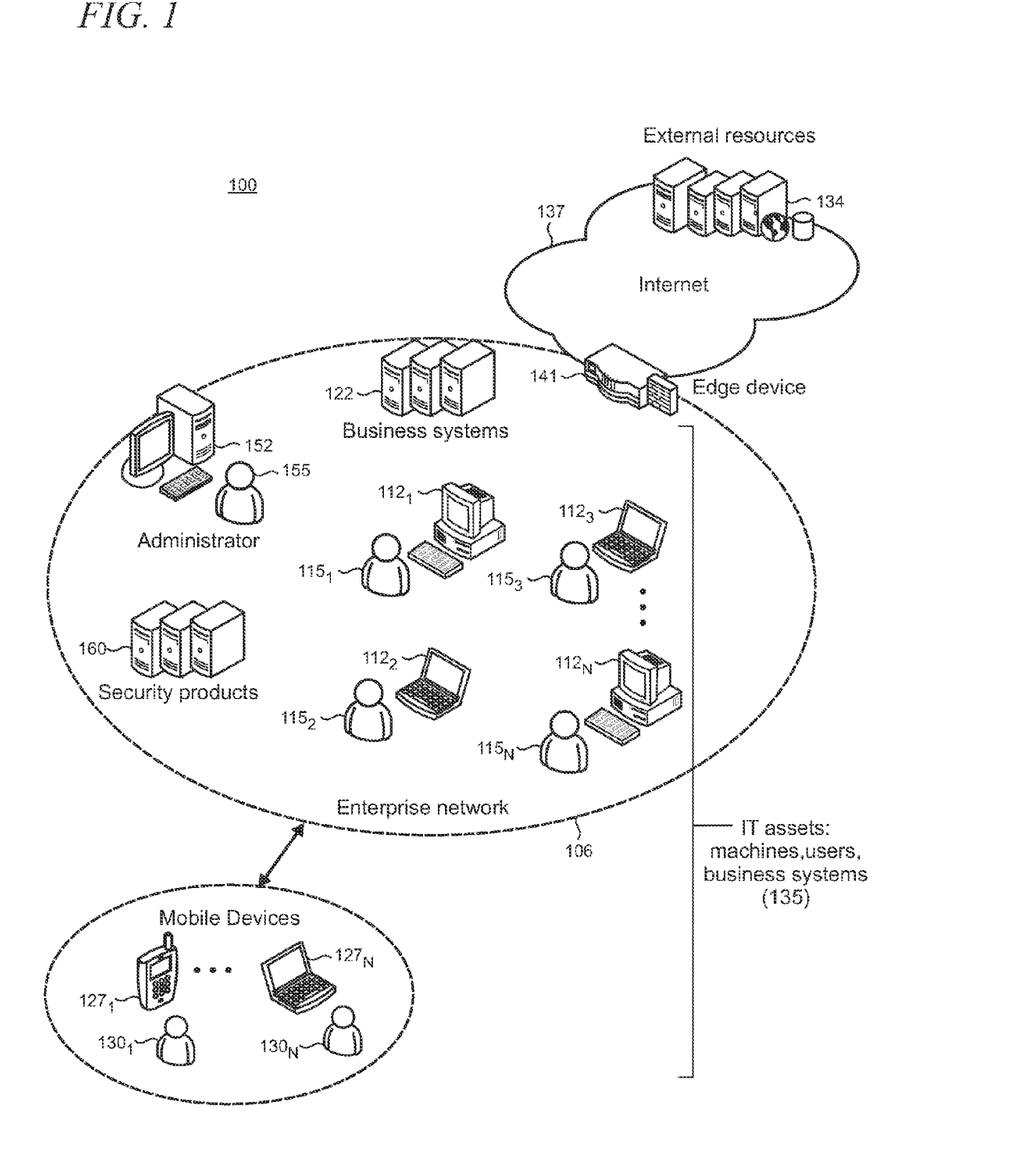
FIG. 1 shows an illustrative enterprise network environment that includes IT assets to which the present techniques for estimating and visualizing security risk may be applied.

FIG. 1 shows an illustrative enterprise networking environment 100 that supports IT assets (which may include both devices and users) to which the present techniques for estimating and visualizing security risk may be applied. An enterprise network 106 (also known as a corporate network or "corpnet") supports a number of computing devices referred to here as "client machines" $112_{1, 2 \ldots N}$ that are utilized by respective users $115_{1, 2 \ldots N}$ to perform computing tasks. A variety of business systems 122 are also supported by the enterprise network 106.

The client machines 112 can take any of a variety of forms and include, for example, desktop PCs (personal computers), laptop PCs, workstations, and the like. The client machines 112 can also include mobile devices such as pocket PCs, smart phones, and the like (as representatively indicated by reference numerals $127_{1 \ldots N}$). The mobile devices 127 may be used by roaming users $130_{1 \ldots N}$ when outside the enterprise or office. It is emphasized that the term "IT assets" may be used to refer to the client machines 112, mobile devices 127, users 115 and 130, business systems 122, or combinations thereof. The collective IT assets are indicated by reference numeral 135.

The business systems 122, which are also commonly known as line of business servers, may also take on a variety of different forms depending on the requirements of a particular implementation. For example, the business systems 122 can support internal operations of the enterprise network including file and database operations, e-mail, etc., and external-facing operations such as line-of-business applications, customer service, payment and e-commerce systems, and the like.

The IT assets 135 may typically access external resources 134 such as websites, databases, FTP (file transfer protocol) sites, external e-mail servers, and the like over an external network such as the Internet 137. An edge device 141 like a firewall or gateway is typically utilized at the perimeter of the enterprise network 106 to monitor traffic flowing between the Internet 137 and the IT assets 135 and block traffic that is suspicious.

The IT assets 135 (which includes users, client machines, business systems, mobile devices, etc.), and the enterprise network 106 as a whole can be subject to malicious attack over several attack vectors. Some of the external resources may pose security threats such as malware contained in e-mail sent to the recipients or that is unsuspectingly downloaded from a website when bundled with other software. The IT assets and enterprise network 106 are also subject to security threats from attacks launched from within the network (e.g., by disgruntled users or uninvited users). And, the mobile devices 127 can be another avenue for security threats that can affect the enterprise by being containers for malware that is picked up outside and then brought by a user 130 inside the protected perimeter.

An administrator ("admin") console 152 is also supported in the enterprise network 106. The admin console 152, in this example, enables configuration and management of the enterprise network 106, such as creating and maintaining user privileges and permissions, monitoring host, server, and network operations and resources, generating reports, setting policies for security and auditing, and the like. And, as discussed in more detail below, the admin console 152 may be further configured to provide visual indications of security risk in the enterprise network 106 to a security administrator 155.

One or more security products 160 are deployed in the enterprise environment 106. As indicated by reference numeral 206 in FIG. 2, the security products 160 are generally configured to monitor various IT assets (as represented by laptop PC $112_3$ and its user $115_3$) for signs of problems, detect a malicious attack or the presence of any malware, and remediate the problems, for example by removing or disabling infected files to restore the affected IT asset to a pre-infected state. The particular choice of security products 160 that may be deployed may vary by implementation. In some implementations, for example, the security products 160 may comprise various security gateway appliances that may provide security features such as unified threat management ("UTM"), edge security (such as the edge device 141), network access protection ("NAP"), SEM (security event management), SIM (security incident management), network intrusion detection (NIDs), identity management, operational health monitoring, host security, line-of-business security, web application protection, configuration management, and the like. In some cases the security products can provide a discrete functionality, while in other cases various functionalities may be combined in a given security product.

Figure 2:
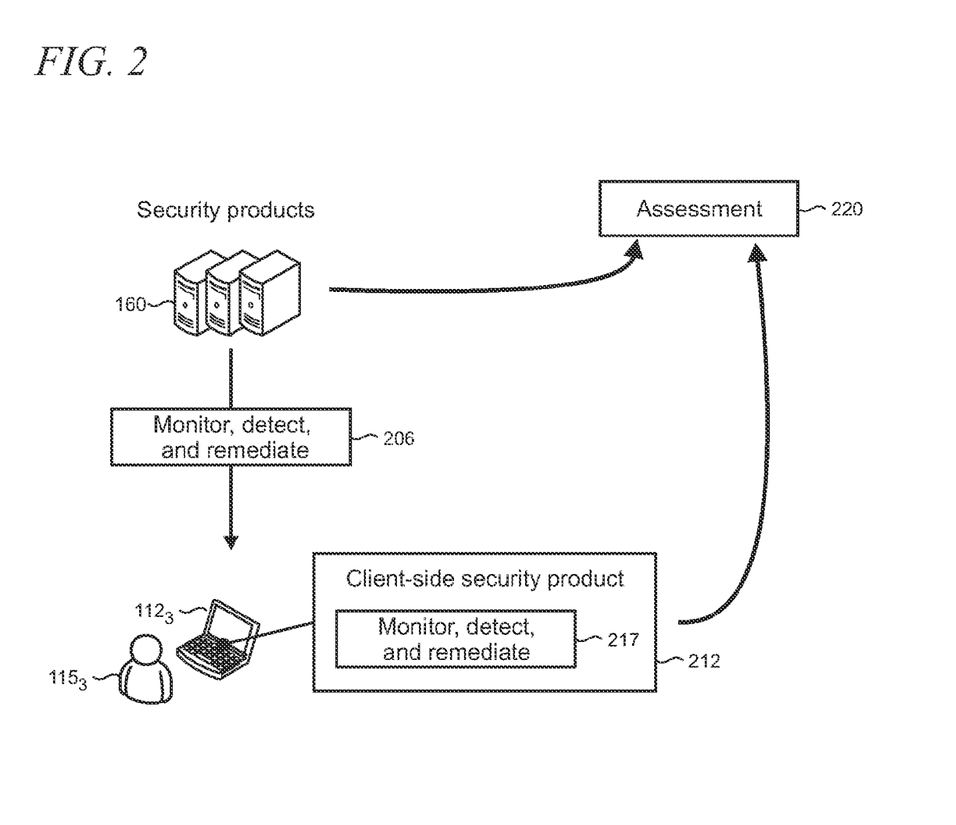
FIG. 2 shows an illustrative arrangement in which security products in the enterprise network may monitor an IT asset and generate an assessment.

Security products may also be implemented as client-side security products (or alternatively, as software services provided from the Internet 137 or other networks) that can run in whole or in part as an application or process on an IT asset 135. Thus, for example, as shown in FIG. 2, a client-side security product 212 is configured to monitor the laptop PC $112_3$, detect attacks and the presence of malware, and remediate the problems caused by the malicious activities or code, as indicated by reference numeral 217. Client-side security products will typically be installed on most enterprise IT assets including both those inside and outside the protected perimeter.

In addition to performing the monitoring, detection, and remediation, the security products 160 and client-side security products 212 are further configured, in accordance with the principles of the present arrangement for estimating and visualizing security risk, to generate assessments 220 about the security state of a monitored IT asset 135.

Assessments 220 are used to categorize security risk for a single IT asset 135 as well as the enterprise network 106 as a whole. In this example, security risk is categorized into one of three discrete levels—high, medium, or low. Such a simple categorization enables the security administrator 155 to quickly identify the problems that require immediate attention. For example, if a line-of-business web-server is compromised by a malicious attack, then the security risk is high. By comparison, if an employee workstation is hacked, then the security risk is low.

Security risk, as the term is used here, means the product of the potential loss to the enterprise if this IT asset is damaged to a certain degree and the probability that the IT asset would be damaged. One example of a security risk in the enterprise network 106 could be that if one of its web-servers were to be disabled by a malicious attack from a hacker, the enterprise would suffer a loss of $2,000 per day.

Figure 3:
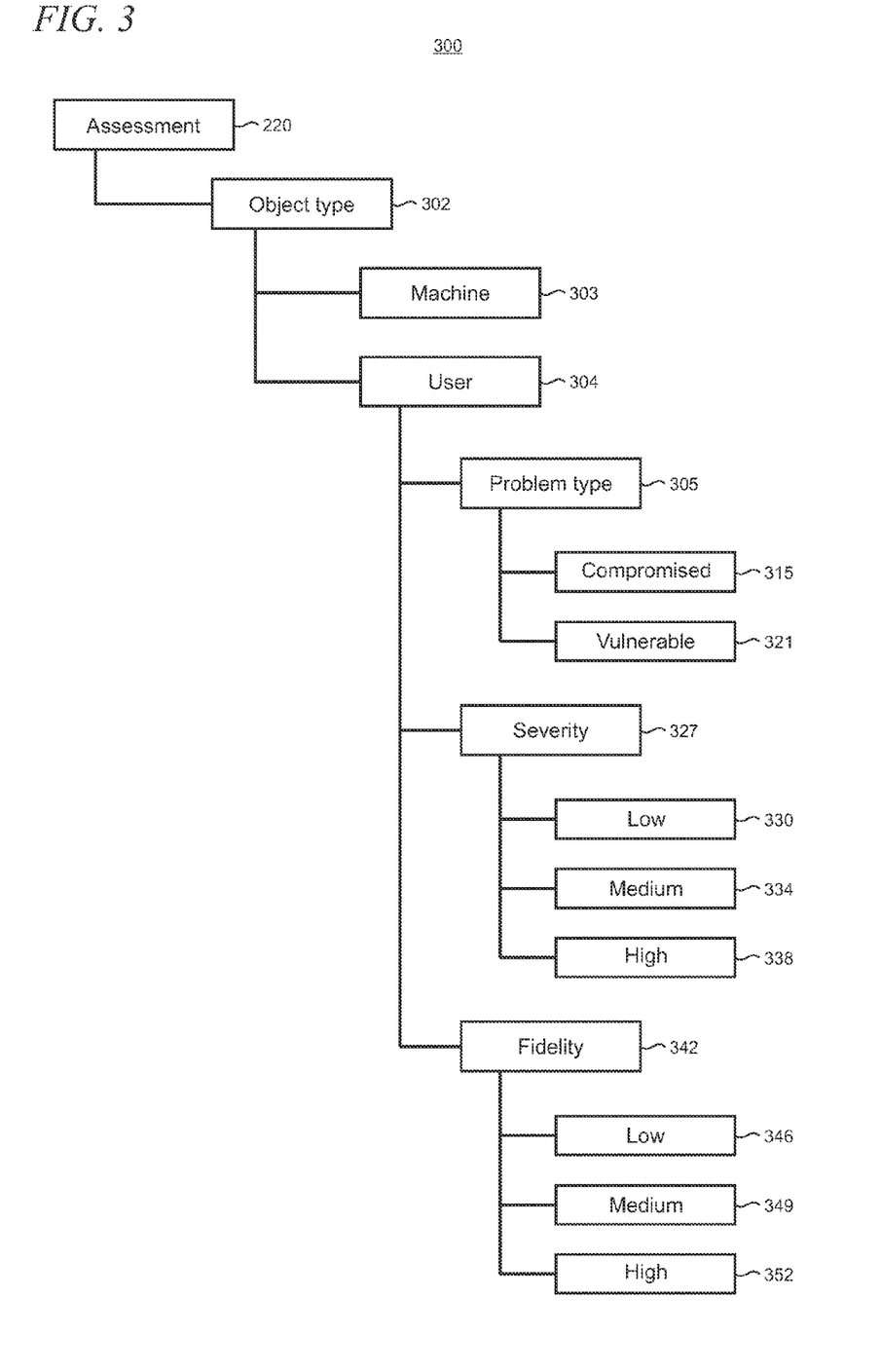
FIG. 3 shows an illustrative security assessment taxonomy.

As shown in FIG. 3, the assessments 220 conform with a taxonomy 300 so that security problems with IT assets, comprising object types 302 including machine 303 and user 304 in this example, are expressed using three fields for each object type (it is noted that while the taxonomy is shown in expanded form for only the user object type, the same form is applicable to the machine object type as well). The first field is the problem type 305 which represents the nature of the security problem. In this particular example, there are two problem types: compromised and vulnerable (as respectively indicated by reference numerals 315 and 321 in the taxonomy 300). A compromised IT asset is an asset that is actively suffering as the result of a malicious activity. For example, a compromised IT asset could be a client machine numeral 112 that is infected with a virus, or a user 115 whose password was stolen. A vulnerable IT asset is an IT asset that suffers from a problem that puts it at more risk to become compromised. For example, a vulnerable IT asset could be a client machine 112 that is missing a recommended security patch. It is noted that the particular problem types described here are intended to be illustrative and that other types may also be utilized as necessary to meet the needs of a particular implementation.

The second field in the taxonomy 300 is severity 327. Severity 327 represents the scope of damage to an affected IT asset. In this example, three values are used for the severity field: low, medium, and high, as respectively indicated by reference numerals 330, 334, and 338. For example, an assessment 220 could be generated having high severity to indicate a vulnerable IT asset if a client machine is missing a critical security patch. On the other hand, if the missing security patch has only moderate importance, then the assessment 220 may have medium severity.

The third field in the taxonomy 300 is fidelity 342. Fidelity 342 represents the confidence that the problem reported in the assessment 220 really exists. In this example, three values are used for the fidelity field: low, medium, and high, as respectively indicated by reference numerals 346, 349, and 352. For example, if the monitoring of the IT assets 135 indicates that a client machine 112 appears to be behaving abnormally, there could be some suspicion that it is compromised. In this case, the generated assessment 220 may have low fidelity. By comparison, if an active worm is detected on the client machine 112 (for example by matching the signature of a known piece of malware), then the assessment 220 may be generated having high fidelity.

In addition to utilizing the assessments 220, security risk is estimated and visualized by categorizing the IT assets 135 in the enterprise network 106 using an asset value field. The asset value essentially represents the importance of an IT asset to the enterprise. As highlighted with the illustrative taxonomy 400 shown in FIG. 4, the asset value field 406 uses three values in this example: normal, important, and critical, as respectively indicated by reference numerals 411, 416 and 420.

Figure 4:
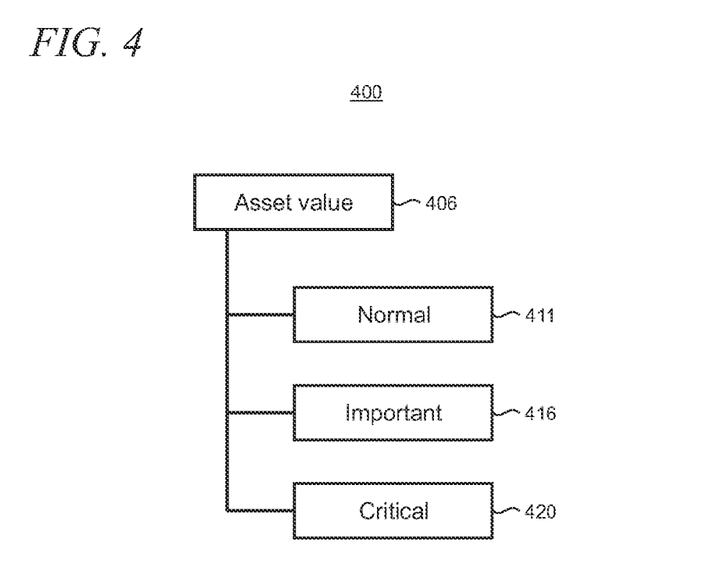
FIG. 4 shows an illustrative asset value taxonomy.

Given that a security risk is the probability of a known loss in an IT asset 135, the security risk for a single asset may be estimated using the value of the asset and information from an assessment 220 for that asset. That is, the asset value field 406 provides an estimation of the known loss in financial terms. The problem type 305 and severity 327 fields provide an estimation of the scope, or magnitude of the loss. For example, in some cases a malicious attack will not cause a total loss of the IT asset 135, but instead damage only a portion of the asset's functionality. Thus, in such cases the value of the severity field 327 could be "low" or "medium" and the expected financial loss would be lower than when the severity value is "high."

The fidelity field 342 in the assessment 220 can thus also represent the likelihood or probability of a loss in an IT asset 135. For example, with a fidelity value of "medium" the probability that the loss is real is 50%. Therefore, in such cases, the estimated security risk would not equate to the total known loss, but only 50% of it. By comparison, if the fidelity is "high," then the greater percentage of the total known loss may be allocated to the security risk associated with a given IT asset 135.

Figure 5:
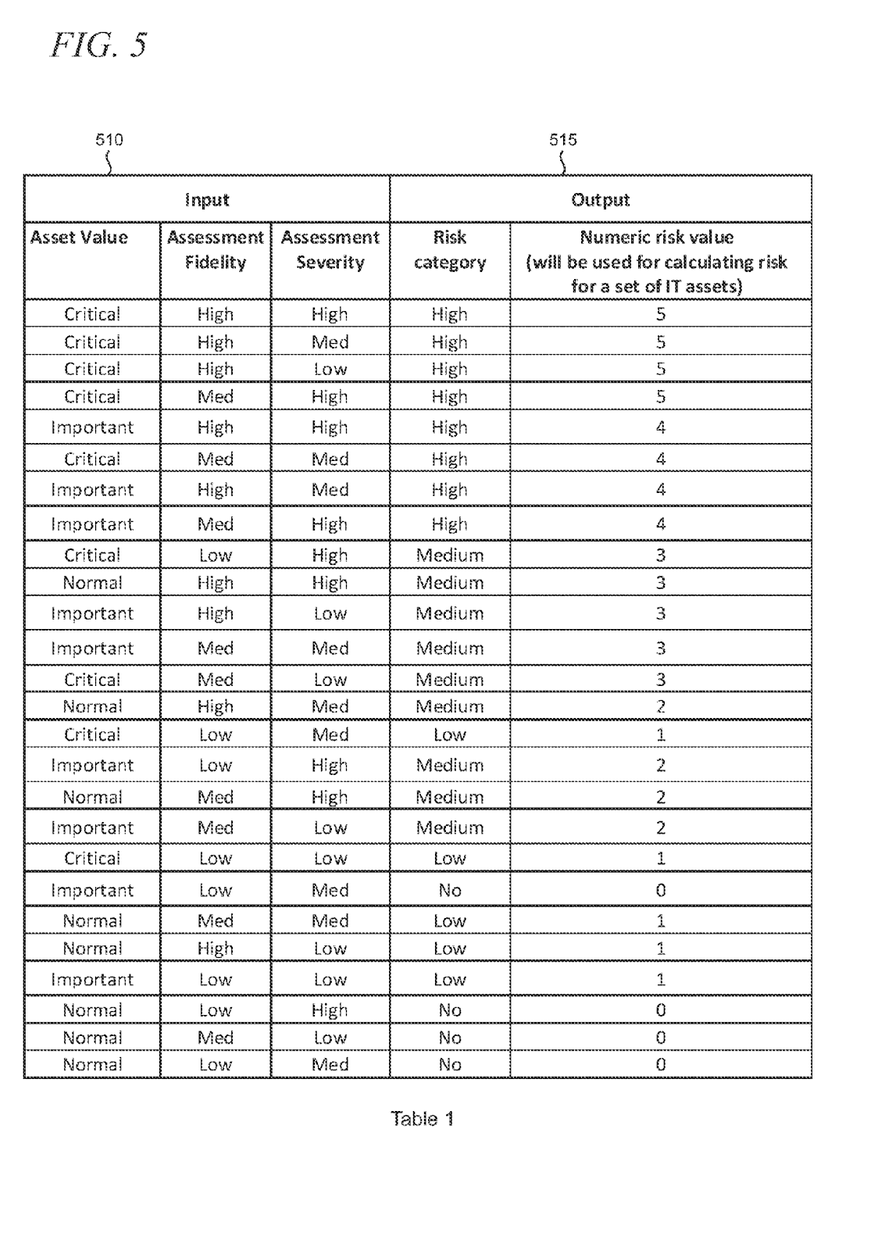
FIG. 5 is an illustrative table that shows how security risk is estimated for a single IT asset when this asset is compromised.
Figure 6:
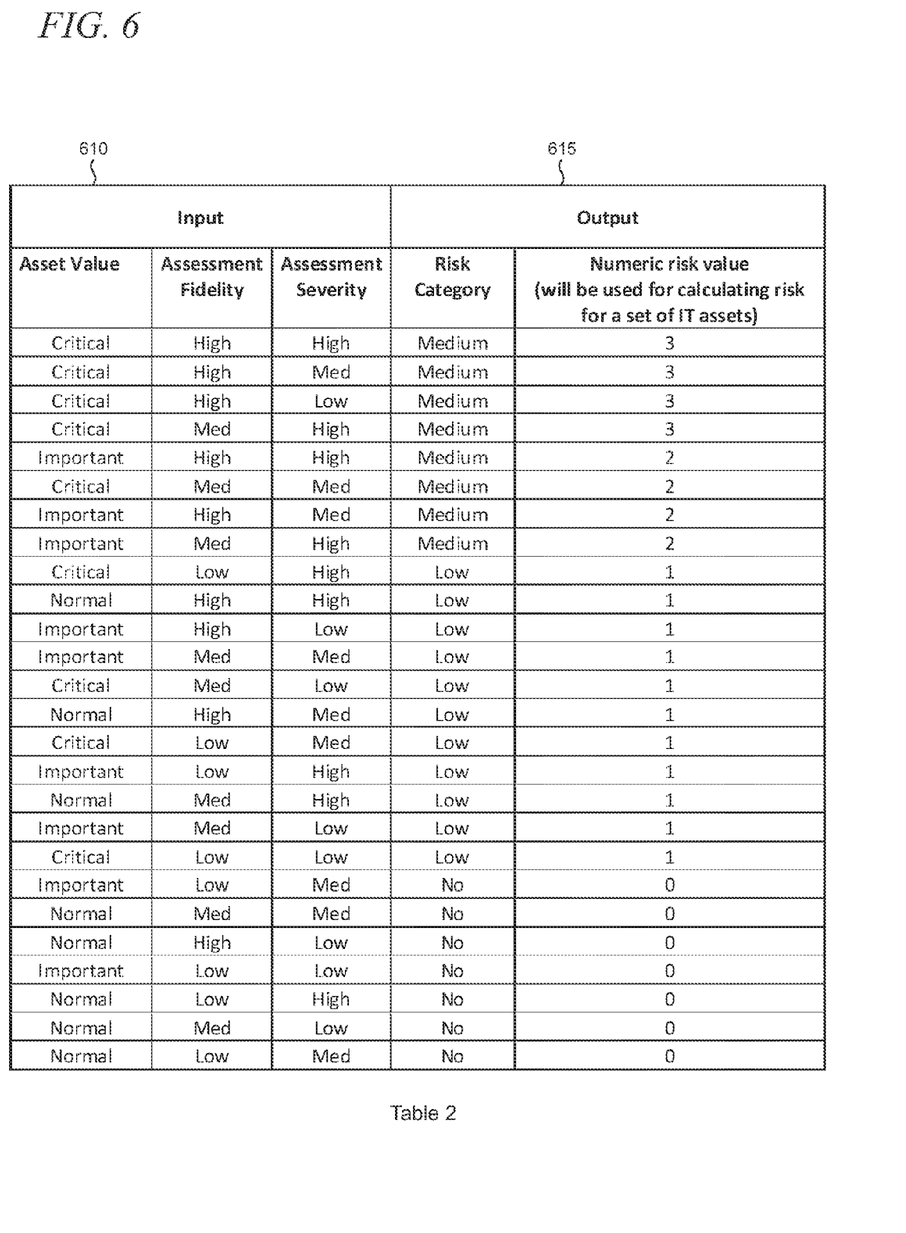
FIG. 6 is an illustrative table that shows how security risk is estimated for a single IT asset when this asset is vulnerable.

FIGS. 5 and 6 show illustrative tables that provide an estimation of security risk for a single IT asset 135 for various combinations of asset value, assessment fidelity, and assessment severity. Table 1 provides the estimates for an IT asset in which the problem type is compromised. Table 2 provides the security risk estimates for a vulnerable IT asset.

Table 1 in FIG. 5 is divided into two columns—input and output, as respectively indicated by reference numerals 510 and 515—to indicate a set of outputs for a given combination of input values. Similarly, Table 2 in FIG. 6 has an input column 610 and an output column 615. As shown, the output column in each table includes a risk category and a numeric risk value.

The estimated security risk is expressed in the output column of a table using one of three discrete categories—high, medium, or low. In this example, the use of relatively simple categories is intended to enable the security administrator to quickly identify problems among the monitored IT assets 135 that require attention. However, it is emphasized that the use of three discrete categories is illustrative and that other categorizations (e.g., including both number and type of categories) may be utilized as needed to meet the needs of a particular implementation.

Figure 9:
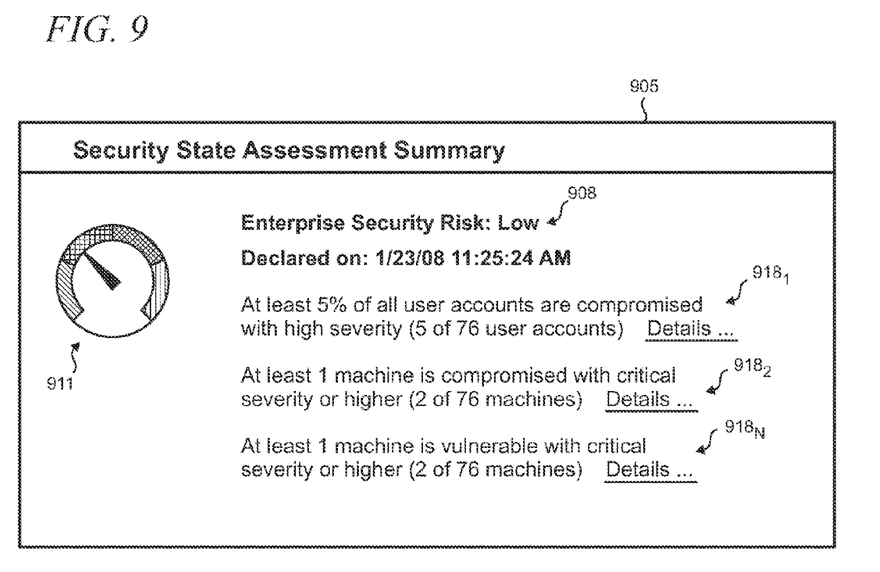
FIG. 9 shows a screen of an illustrative graphical user interface ("GUI") that may be utilized to enable a security administrator to visualize security risk for an enterprise network.
Figure 10:
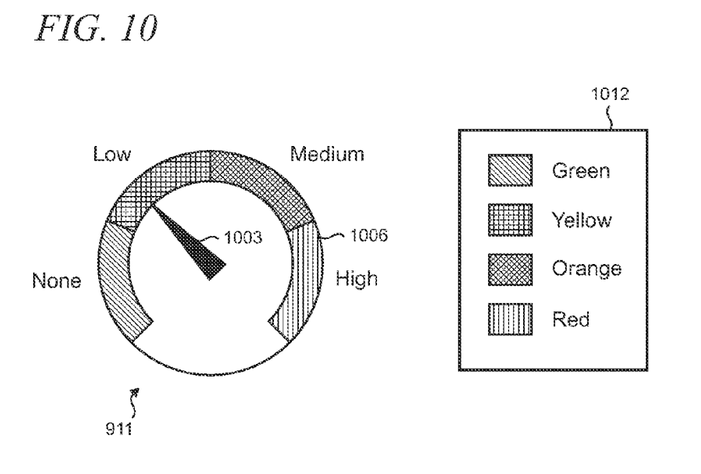
FIG. 10 shows details of the illustrative continuous risk meter used in the GUI shown in FIG. 9.

The numeric risk value shown in the output column of Table 1 and Table 2 is used to calculate the security risk for a set of IT assets, for example the security risk for the enterprise network 106 as a whole. In this example, the discrete categories used to express security risk for a set of IT assets is the same as for a single IT asset as described above, namely high, medium, or low. In addition to the discrete categories, security risk may be expressed in a continuous manner which is then provided using a visual display, as shown in FIGS. 9 and 10 and described in the accompanying text.

A high-level overview of an illustrative algorithm which can be used to perform the calculation of security risk for a set of IT assets is shown below.

1. The algorithm assumes that there are a total of N members in the set of IT assets.
2. The members in the set of IT assets are grouped based on their numeric risk values (which means that there can be five groups at most).
3. For each group in step '2', the discrete security risk category is determined.
4. The discrete security risk for the set of IT assets is set based on the group having the maximum risk that is identified in step '3'.
5. A value for the continuous risk expression may be calculated for the set of IT assets to provide a more refined risk representation compared to the discrete categories.

The algorithm is presented more formally below. It uses a set of rules that are included in Table 3 shown in FIG. 7 as indicated by reference numeral 703. The rules 703 determine which discrete security risk category (i.e., low, medium, or high) is applied to the IT assets.

Figure 7:
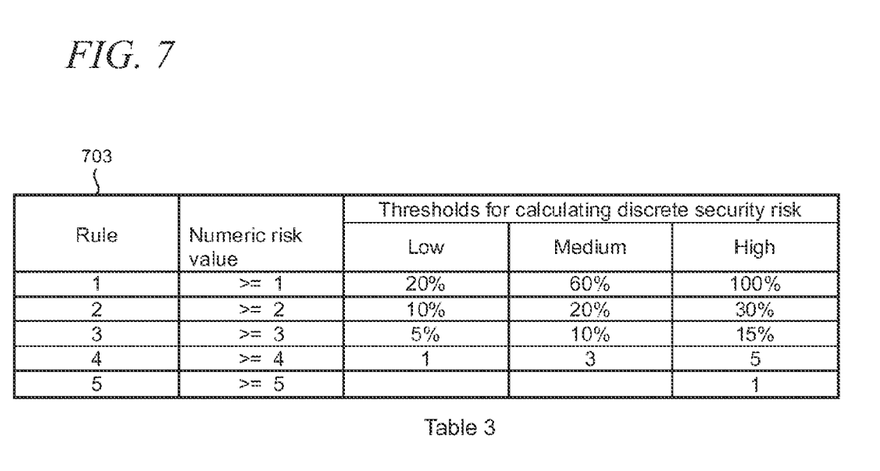
FIG. 7 is an illustrative table that includes rules for determining a discrete risk category (e.g., low, medium, or high) that may be used to characterize the security risk for a set of IT assets.

1. Let N be the total number of members in the set of IT assets.
2. Let n1, n2, n3, n4, and n5 be the set of IT assets having members with a numeric risk value that is greater than or equal to 1, greater than or equal to 2, greater than or equal to 3, greater than or equal to 4, or greater than or equal to 5, respectively.
3. Let d1, d2, d3, d4, and d5 be the discrete security risk imposed by n1, n2, n3, n4, and n5, respectively.
4. Initialize each of d1, d2, d3, d4, and d5 to none (i.e., no security risk).
5. Calculate the discrete security risk d1 to d5 using the rules from Table 3:

(a) If $\left(\frac{|n1|}{N} \geq 0.2 \text{ and } \frac{|n1|}{N} < 0.6\right)$ d1 = low    // based on Rule #1 in Error! Reference source not found.

(b) If $\left(\frac{|n1|}{N} \geq 0.6 \text{ and } \frac{|n1|}{N} < 1\right)$ d1 = medium    // based on Rule #1 in Error! Reference source not found.

(c) If $\left(\frac{|n1|}{N} \geq 1\right)$ d1 = high    // based on Rule #1 in Error! Reference source not found.

(d) If $\left(\frac{|n2|}{N} \geq 0.1 \text{ and } \frac{|n2|}{N} < 0.2\right)$ d2 = low    // based on Rule #2 in Error! Reference source not found.

(e) If $\left(\frac{|n2|}{N} \geq 0.2 \text{ and } \frac{|n1|}{N} < 0.3\right)$ d2 = medium    // based on Rule #2 in Error! Reference source not found.

(f) If $\left(\frac{|n2|}{N} \geq 0.3\right)$ d2 = high    // based on Rule #2 in Error! Reference source not found.

(g) If $\left(\frac{|n3|}{N} \geq 0.05 \text{ and } \frac{|n3|}{N} < 0.1\right)$ d3 = low    // based on Rule #3 in Error! Reference source not found.

(h) If $\left(\frac{|n3|}{N} \geq 0.1 \text{ and } \frac{|n3|}{N} < 0.15\right)$ d3 = medium    // based on Rule #3 in Error! Reference source not found.

(i) If $\left(\frac{|n3|}{N} \geq 0.15\right)$ d3 = high    // based on Rule #3 in Error! Reference source not found.

(j) If (n4 $\geq$ 1) d4 = medium    // based on Rule #4 in Error! Reference source not found.
   (k) If (n4 $\geq$ 3) d4 = medium    // based on Rule #4 in Error! Reference source not found.
   (l) If (n4 $\geq$ 5) d4 = medium    // based on Rule #4 in Error! Reference source not found.
   (m) If (n5 $\geq$ 1) d5 = high    // based on Rule #4 in Error! Reference source not found.

-continued

6. The discrete risk level for the set of IT assets is max(d1, d2, d3, d4, d5).
7. The expression of continuous risk level is then calculated:
   (a) Select the rule in Table 3 that causes the maximum security risk.
   (b) Assume that continuous risk is expressed using a value between 0 and 1.
   (c) Assume that the rule from Table 3 specifies three thresholds t1, t2, and t3.
   (d) Let t0 = 0 and t4 = 1.
   (e) Assume that the number of IT assets that satisfies the rule is n (which is one of n1 to n5 from step '2' above).

(f) Find i such that $t_i \le \frac{n}{N} < t_{i+1}$ (g) Calculate the continuous risk expression value using $$\left(\frac{n}{N} - t_i\right) / (t_{i+1} - t_i)$$

Figure 8:
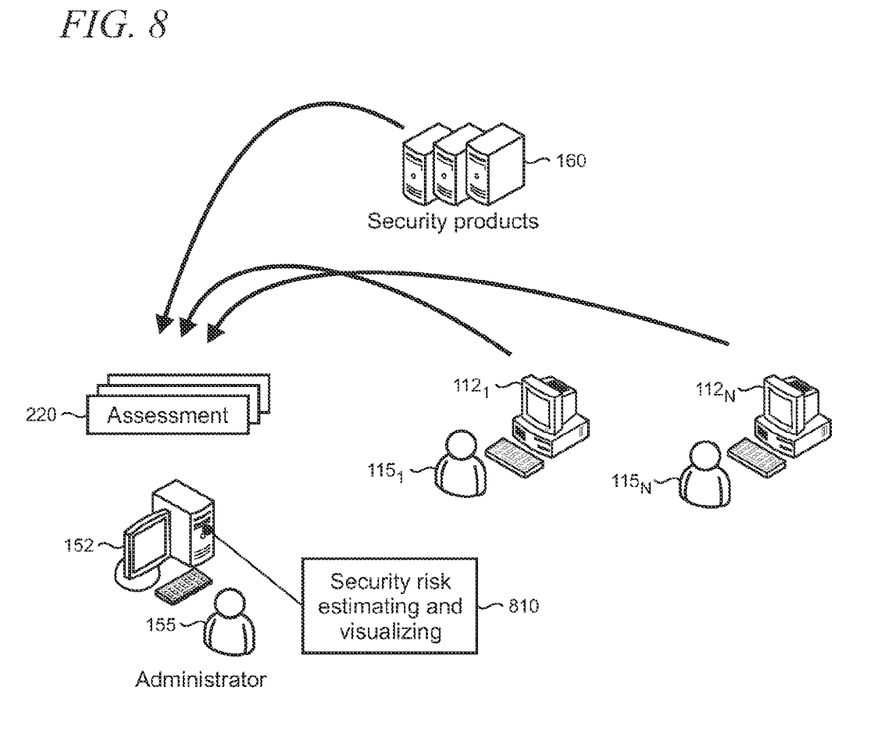
FIG. 8 shows an illustrative security risk estimating and visualizing application that is arranged to run on an administrator console.

Once the security risk for a set of IT assets 135 is determined using the algorithm, it can be displayed in visual form to the security administrator 155 using, for example, the admin console 152. In one illustrative example, as shown in FIG. 8, the admin console 152 can host an application 810 that is configured for estimating and visualizing security risk in an enterprise network. The estimating and visualizing application 810 may collect one or more assessments 220 from the security products 160. In alternative implementations, the application 810 may run on a client machine 112, a business system 122 such as an enterprise server, or one of security products 160. Functionality supported by the application 810 can also be alternatively implemented as a process or service that runs on any of the devices described above, or be provided by a platform or service that is located outside the enterprise network 106.

The application 810 can utilize an assessment 220 and IT asset value 406 and locate the appropriate risk category and numeric risk value from Table 1 and Table 2 (which can be implemented as look up tables that the application 810 may access). The application 810 will then apply the algorithm described above to prepare and present the security risk that is applicable to the enterprise at that particular point in time in visual form to the security administrator 155 using the display on the admin console 152.

FIG. 9 shows a screen 905 of an illustrative GUI supported by the risk estimating and visualizing application 810 that may be utilized to enable a security administrator to visualize security risk for the enterprise network 106. As shown, the screen 905 provides a security assessment summary for the enterprise network 106 using three types of communication. First is the categorization of the security risk into one of three discrete categories (i.e., low, medium, or high). In this example, the security risk for the enterprise network 106 is categorized as "low," as indicated by reference numeral 908 on the screen 905.

The second type of communication comprises a continuous risk display. In this particular example, security risk is visually communicated using a color coded dial indicator 911. As shown in the enlarged view in FIG. 10, the indicator 1003 (i.e., an elongated triangular pointer) may be positioned anywhere along a color coded continuum. The color coding, in this example, includes segments along the dial 1006 which include green, yellow, orange, and red (as indicated in the key 1012). The colored segments respectively correspond to security risk categories of none (i.e., no security risk), low, medium, and high. Use of a continuous display as provided by the dial indicator 911 supplies additional refinement to the discrete security risk categorization and enables the security administrator 155 to understand whether the low security risk, in this particular example, is closer to "medium" or is closer to "none."

As conditions dynamically change in the enterprise network 106 some of the IT assets 135 may be impacted by security problems while other assets may have their problems remediated. The changing conditions may then be reflected in a change to the discrete categorization of security risk and/or change to the position of the indicator 1003 on the dial 1006, as appropriate.

Referring back to FIG. 9, the third type of communication includes text explanations that provide reasons for any security risk that is declared. In this example, there are three text explanations $918_{1, 2, \ldots, N}$. The explanations 918 can provide context for the security administrator 155 as to how the security risk in the enterprise network 106 reached a particular level or security risk category. In addition, the security administrator can click on an embedded link in the explanations to get additional detail about a specific problem.

The text explanations 918 are generated by adding an additional sub-step (a) to step '6' in the algorithm above.
   (a) For every $d_i$ (i between 1 and 5)
      i. If $d_i$=max (d1, d2, d3, d4, d5), then add an explanation that describes the condition that is applicable from the line in the algorithm that determined $d_i$, i.e., lines 5(a) to 5(m).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium not comprising a propagated data signal containing instructions which, when executed by one or more processors disposed in an electronic device, perform a method for estimating risk for an IT asset in an enterprise network, the method comprising the steps of:
   receiving an assessment about a security state of the IT asset, the assessment being configured for communicating data indicating a type of problem with the IT asset, a severity of the problem, and a level of confidence that the problem with the IT asset exists;
   applying a value of the IT asset and the data from the assessment to estimate a discrete risk category that is applicable to the IT asset;

estimating a security risk for the IT asset using a continuous risk expression; and providing a visualization of the continuous risk expression through a GUI, the GUI including a dial indicator.

2. The computer-readable medium of claim 1 in which the GUI is configured to display the visualization using a color-coded indicator to show different levels of discrete risk.

3. The computer-readable medium of claim 2 in which the value of the IT asset is utilized to represent a known financial loss.

4. The computer-readable medium of claim 1 in which the severity is further utilized to represent a scope of the loss.

5. The computer-readable medium of claim 1 in which the level of confidence is further utilized to represent a probability of the loss.

6. The computer-readable medium of claim 1 in which the IT asset is a computing device or a user of the computing device, the computing device being one of desktop PC, laptop PC, workstation, server, business system, or mobile computing device.

7. A computer-readable medium not comprising a propagated data signal containing instructions which, when executed by one or more processors disposed in an electronic device, perform a method for using an assessment that describes a state of security for an IT asset, the method comprising the steps of:

monitoring the state of security for the IT asset;

generating the assessment when a security problem is detected that affects the IT asset, the assessment being configured for communicating data indicating a type of problem with the IT asset, a severity of the problem, and a probability of known loss with the IT asset;

sending the assessment to an application, process, or service for processing, the processing being configured for providing an estimate of security risk that is associated with the monitored IT asset, wherein the estimate of security risk is provided using a continuous risk expression; and providing a visualization of the continuous risk expression through a GUI, the GUI including a dial indicator.

8. The computer-readable medium of claim 7 in which the method is performed using one of security product deployed in an enterprise network, a client-side security product, an enterprise server, or an external service.

9. The computer-readable medium of claim 7 in which the type of problem comprises one of compromised IT asset or vulnerable IT asset.

10. The computer-readable medium of claim 7 in which the processing includes a consideration of IT asset value when providing the estimate of security risk.

11. The computer-readable medium of claim 7 in which the estimate of security risk is displayed using one of a plurality of discrete risk categories or continuously-expressed security risk.

12. The computer-readable medium of claim 7 in which the security risk comprises a probability of a known loss in an IT asset.

13. A method implemented using a computing device for providing a visualization of security risk for a set of IT assets in an enterprise, the method comprising the steps of:

estimating a discrete security risk for the set of IT assets, the estimating comprising assigning a risk category based on a combination of IT asset values, severity of security problems affecting the IT assets, and fidelity of assessments describing a security state for each of the IT assets in the set;

calculating a continuously-expressed security risk from numeric risk values, the numeric risk values being based on a combination of IT asset values, severity of security problems affecting the IT assets, and fidelity of assessments describing a security state for each of the IT assets in the set; and dynamically displaying the discrete security risk and the continuously-expressed security risk through a GUI operating on the computing device.

14. The method of claim 13 in which the IT assets comprise at least one of IT assets disposed within a perimeter of an enterprise network or IT assets that are located outside the perimeter.

15. The method of claim 13 including a further step of looking up the discrete risk category from a look up table.

16. The method of claim 13 including a further step of looking up the numeric risk values from a look up table.

17. The method of claim 13 in which the continuously-expressed security risk is displayed using a color-coded meter.

18. The method of claim 13 including a further step of displaying one or more explanations to accompany the visualization of security risk for the set of IT assets in the enterprise.

* * * * *